US012026238B1

(12) United States Patent
Yembari et al.

(10) Patent No.: US 12,026,238 B1
(45) Date of Patent: Jul. 2, 2024

(54) SYSTEM FOR OPTIMIZING SOFTWARE APPLICATION LICENSES

(71) Applicant: ZLURI TECHNOLOGIES PRIVATE LIMITED, Hyderabad (IN)

(72) Inventors: Chaithanya Yembari, Hyderabad (IN); Sethu Meenakshisundaram, Hyderabad (IN); Ritish Reddy, Hyderabad (IN); Chinmay Panda, Hyderabad (IN); Paritosh Lokhande, Hyderabad (IN); Vanketesh Kumar, Hyderabad (IN); Kunj Jignesh Maniar, Hyderabad (IN)

(73) Assignee: ZLURI TECHNOLOGIES PRIVATE LIMITED, Hyderabad (IN)

( * ) Notice: Subject to any disclaimer, the term of this patent is extended or adjusted under 35 U.S.C. 154(b) by 0 days.

(21) Appl. No.: 18/216,290

(22) Filed: Jun. 29, 2023

(30) Foreign Application Priority Data

Apr. 18, 2023 (IN) .............................. 202341028315

(51) Int. Cl.
*G06F 21/10* (2013.01)

(52) U.S. Cl.
CPC .... *G06F 21/105* (2013.01); *G06F 2221/2141* (2013.01)

(58) Field of Classification Search
CPC ........... G06F 21/105; G06F 2221/2141; G06F 21/10; G06F 21/552
See application file for complete search history.

(56) References Cited

U.S. PATENT DOCUMENTS

| 10,592,887 | B2 | 3/2020 | Aggarwal et al. |
| 11,204,903 | B2 | 12/2021 | Peterkin et al. |
| 2004/0010471 | A1* | 1/2004 | Lenard ................. G06F 21/105 |
| | | | 705/59 |
| 2013/0191923 | A1* | 7/2013 | Abuelsaad ............. H04L 67/10 |
| | | | 726/26 |
| 2014/0052610 | A1* | 2/2014 | Aggarwal ............. G06Q 10/06 |
| | | | 726/26 |

(Continued)

OTHER PUBLICATIONS

Malvey et al., The ultimate Guide to software license optimization, Apr. 13, 2023, Nexthink, pp. 1-16 (Year: 2023).*

(Continued)

*Primary Examiner* — Dao Q Ho
(74) *Attorney, Agent, or Firm* — Shumaker, Loop & Kendrick, LLP

(57) ABSTRACT

A system and method for license optimization of a software application in an organization. A usage data of a feature of a software application from one or more disparate sources is received. Subsequently, a usage insight of the feature of the software application is determined based on the usage data. A license optimization recommendation is provided to a user based on the usage insight of the feature of the software application. Further, the license optimization recommendation is provided using a machine learning model. Also, the license optimization recommendation comprises reallocation of a license tier of the software application. The system and method further forecasts a number of licenses required based on the usage insight of the feature of the software application in an organization.

17 Claims, 2 Drawing Sheets

(56) References Cited

U.S. PATENT DOCUMENTS

| | | | | |
|---|---|---|---|---|
| 2014/0304129 A1* | 10/2014 | Colosso | ............ | G06Q 30/0645 |
| | | | | 705/310 |
| 2019/0340098 A1* | 11/2019 | Green, III | ........... | G06F 11/3495 |
| 2020/0349134 A1* | 11/2020 | Peterkin | ............. | G06Q 10/0631 |
| 2020/0387584 A1* | 12/2020 | Gaber | ................ | G06F 11/3419 |
| 2021/0208993 A1* | 7/2021 | Moyal | ................ | G06F 11/3438 |
| 2021/0295223 A1* | 9/2021 | Freeman | ............. | G06F 11/3428 |
| 2021/0344509 A1* | 11/2021 | Finke | ................... | H04L 9/3226 |
| 2022/0158848 A1* | 5/2022 | Finke | ................... | H04L 9/3247 |

OTHER PUBLICATIONS

Software License Optimization: Remove Unused Applications to Save Costs, Nexthink, https://www.nexthink.com/resource/software-license-optimization-remove-unused-applications-to-save-costs, Jun. 17, 2022.

\* cited by examiner

SYSTEM FOR OPTIMIZING SOFTWARE APPLICATION LICENSES

PRIORITY INFORMATION

The present application claims priority from the Indian application no. 202341028315 filed on 18 Apr. 2023.

TECHNICAL FIELD

The present subject matter described herein, in general, relates to software applications license optimization in an organization, and more particularly, relates to techniques for software application license tier optimization based on feature usage of the software application.

BACKGROUND

In many organizations, various software applications are used to support different business functions. Each application requires a license to be used, and organizations often purchase licenses in bulk to support their workforce. However, managing these licenses can be a complex task, as it requires keeping track of license usage, renewals, and compliance requirements. Overbuying or underbuying licenses can result in unnecessary expenses or non-compliance issues, respectively. The organizations often purchase software applications with multiple tiers of licenses based on the number of features or the number of users who will access those features. However, these licenses are not always utilized to their full capacity, which leads to a waste of resources and costs for the organization. Further, inappropriate software application license utilization results in the wastage of hardware resources. For example, in Software as a Service (SaaS) application deployment, various cloud resources such as processing power and storage and network resources are allocated based on the license tier requirement. Similarly, various security requirements would vary based on the different license tier requirements, which require different resources and gets unaddressed if software application licenses are not managed efficiently. Therefore, there is a need for software application license use optimization in organizations.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for license optimization of a software application. This summary is not intended to identify essential features of the claimed subject matter nor is it intended for use in determining or limiting the scope of the claimed subject matter.

In one implementation, a method for license optimization of a software application in an organization is disclosed. A processor receives usage data of a feature of a software application from one or more disparate sources. The processor determines usage insights of the feature of the software application based on the usage data. Further, a license optimization recommendation is provided to a user based on the usage insight of the feature of the software application. A machine learning model is used for providing the recommendation. The license optimization recommendation comprises reallocation of a license tier of the software allocation. The method further forecasts a number of licenses required based on the usage insight of the feature of the software application in an organization.

In another implementation, a computer programmable product embodying a computer program executable in a computing device is disclosed. The computer program provides recommendations for license optimization of a software application in an organization. The computer programmable product stores instructions for receiving usage data of a feature of a software application from one or more disparate sources. A usage insight of the feature of the software application is determined based on the usage data. Thereafter, a license optimization recommendation is provided to a user based on the usage insight of the feature of the software application. The recommendation is provided using a machine learning model, and wherein the license optimization recommendation comprises reallocation of a license tier of the software application. Further, a number of licenses required are forecasted based on the usage insight of the feature of the software application in an organization.

In one aspect, the aforementioned method for license optimization of a software application in an organization may be performed by a processor using programmed instructions stored in a memory.

BRIEF DESCRIPTION OF THE DRAWINGS

The foregoing detailed description of embodiments is better understood when read in conjunction with the appended drawings. For the purpose of illustrating the present subject matter, an example of a construction of the present subject matter is provided as figures, however, the invention is not limited to the specific systems and methods for license optimization of a software application in an organization disclosed in the document and the figures.

Figure 1:
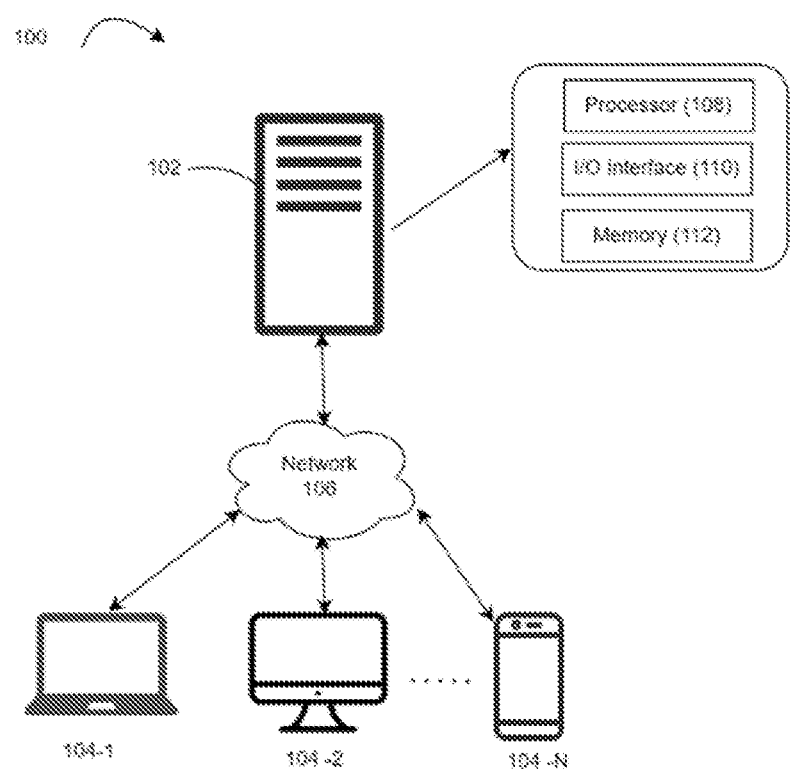
FIG. 1 illustrates a system implementation of license optimization of a software application in an organization, in accordance with an embodiment of the present subject matter.

The figures depict an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "determining," "providing," "optimization," "recommendation," "forecasting", "de-provisioning", "received" and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Although any system and methods similar or equivalent to those described herein can be used in the practice or testing of embodiments of the present disclosure, the exemplary system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for license optimization of a software application in an organization. The software application generally includes multiple features to perform tasks of varying degrees of complexity. Further, the various features of the software application are associated with different license tiers. For example, a basic version of the software application may be provided in a lower license tier, and on the other side, a feature rich version of the software application may be provided in a higher license tier version. The method determines the usage insight of a feature of the software application based on the usage data obtained from multiple sources. The recommendation for license optimization is provided using machine learning techniques based on the usage insight. The recommendation for license optimization may include the re-allocation of the license tier for the software application. For example, the software application feature usage insight may indicate the paid features of a particular software application are not being used by the user, and therefore the system may automatically recommend to de-provision or downgrade the user from paid subscription of the software application to the basic version of the software application. Further, based on the feature usage pattern, the method, and system may forecast the number of licenses required for a given period of time.

Additionally, the method and system provide automatic license optimization using machine learning based on the usage insight. For example, if the software application feature usage insights in an organization indicate that a set number of software application licenses are not required, the system may automatically de-provision or not recommend renewal in next renewal cycle. For example, a video conferencing solution such as Zoom® provides a premium feature of recording a particular conference call. In an organization, if this feature is not being used by the subscribed users, the system may automatically not renew this premium feature and de-provision the specific licensed users who are not in need of this feature. Further, the automatic license optimization may be performed for at least one of a license tier, a license cost, and the number of licenses of the software application.

Referring now to FIG. 1, a system 100 implementation for a license optimization of a software application in an organization is disclosed. Initially, a server or a computer 102 receives usage data for one or more software applications from a plurality of disparate sources. In an example, the software application may be installed on a user device 104-1. It may be noted that the one or more users may access the server 102 through one or more user devices 104-2, 104-3 . . . 104-N, collectively referred to as user devices 104, hereinafter, or software applications residing on the user devices 104. The server 102 receives usage data for one or more software applications from a plurality of sources in a raw format from one or more user devices 104. For example, the raw format data may include log files, database entries, or JSON files including usage data for one or more software applications. Further, the system may also 102 receive feedback from a user using the user devices 104.

Although the present disclosure is explained considering that the system 100 is implemented on a server 102, it may be understood that the server 102 may be implemented in a variety of computing systems, such as a laptop computer, a desktop computer, a notebook, a workstation, a virtual environment, a mainframe computer, a server, a network server, a cloud-based computing environment. The server 102 may be accessed by multiple users through one or more user devices 104-1, 104-2 . . . 104-N. In one implementation, the server 102 may comprise the cloud-based computing environment in which the user may operate individual computing systems configured to execute remotely located software applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the server 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

The system 100, performs the software application license optimization based on the software application feature usage data. The feature usage data indicates the various activities of one or more users on the software application. At first, a user may use the user device 104 to access the server 102 via the I/O interface 110. The user may register the user devices 104 using the I/O interface 110 in order to access the server 102. The detailed functioning of the system 100 is described below with the help of figures.

The system 100 as described herein includes a processor 108 and a memory 112 coupled to the processor 108. The processor 108 is configured to execute a set of program instructions stored in a memory 112. The processor 108 receives usage data from features of software applications. A software application is a tool, or a software used for performing day-to-day tasks in an organization. For example, software applications such as Google's G Suite™, Slack®, Jira®, Zoom®, Salesforce® etc. These software applications are also popularly known as Software as a Service (SaaS) applications or on-demand software. Users can connect to and use these cloud-based applications online as they are centrally hosted. The usage data of a feature of a software application is received from a variety of sources and in huge volume. The sources may include different integration platforms, such as a Single Sign On (SSO) integration platform, an application integration platform, a browser extension, a desktop agent, and a cloud access security broker (CASB). The SSO integration generally provides information related to user, email id, access rights, application and login details etc., via an SSO provider for example Google Workspace™, Microsoft Azure® AD, OKTA® etc. Similarly, the application integration platform may provide usage details of any software application, the different software applications that are subscribed by a particular user, a track record of log in times, license information about application, etc. The variety of sources supports extracting feature usage data of one or more features of the software application. For example, feature usage data may indicate if a user is using a particular feature of the software application or not. In another embodiment, the feature usage data may provide the frequency of usage of a particular feature. Also, the system may provide the volume of feature usage for any software application to quantify the feature usage.

Further, the usage data received from the variety of integration platforms is very high in volume due to massive usage data collected frequently in the form of log files, database entries, or JSON files. In some embodiments, the frequency of usage data collection may be activity driven, for example, every action performed by a user on the software application may be captured in the form of activity logs. The huge volume of usage data helps in identifying various insights of the software application usage. Therefore, these variety of sources or integrations helps in extracting massive usage data and derive actionable usage insights of multiple software applications.

For example, a software application could be a video conferencing application such as Zoom™. The various attributes or features of the Zoom™ application usage could be Duration of a Meeting, Number of Attendees Per Meeting, Cloud Storage, Essential Apps, Call Recording etc. The feature usage data may indicate the number of meeting invites for a user on daily basis, number of meetings attended, duration of each meeting, etc. The processor 108 determines usage insights based on the received feature usage data from multiple user devices 104-1, 104-2 . . . 104-N. The feature usage insights of the Zoom® application may include average meeting duration for the user, average number of attendees in the meeting if a user is the host, and also the number of meetings per day. The feature usage insights are derived from the feature usage data provided by different integration platforms or data sources. The various attributes or features of a software application may refer to a characteristic or quality that describes the behaviour, functionality, or performance of the software application. The other attributes of the software applications may relate to usability, security, and reliability. The various attributes are implemented via software codes, design of User Interface (UI) elements, performance attributes may depend on the efficiency of algorithms and type of data structures used.

The different integration platforms determine the software application feature usage data of different applications via Application Programming Interface (API). An API acts as a gateway between a web server and the software application or the SaaS application. For example, a Single Sign On (SSO) which is a session and user authentication service lets users utilize one set of login credentials to access multiple applications. The SSO integration in this case when integrated directly with the identity providers like OKTA™, ONELOGIN™, Microsoft Azure™ AD and G Suite™ will provide one set of credentials like username and password to access different software applications. Additionally, this integration also provides insights on different applications used such as usage pattern of these software applications, type of application, security standards, access rights etc. The integration platforms may obtain this type of information with publicly available APIs. Additionally, the audit logs are also made available for obtaining different insights on system activities for compliance such as date and time of any activity, the owner of any activity, category of activity and so on.

A typical SSO platform operates in below sequence:
A. A user visits the Service Provider's app or website. For e.g.: Application vendors like Slack® or Zoom®.
B. The Service Provider sends the SSO platform, (Identity Provider) for example Microsoft Azure™ AD, a token containing user information, like their email address, to authenticate the user.
C. The Identity Provider first checks if the user has been authenticated; if so, it grants access to the Service Provider application and skips to Step e).
D. If the user hasn't logged in, they'll be asked for the Identity Provider's credentials. This could be a username and password or a One Time Password (OTP).
E. After validating the credentials, the Identity Provider sends a token to the Service Provider to confirm authentication.
F. The user's browser sends the Service Provider this token.
G. The Service Provider validates the token based on the trust relationship set up during initial configuration and then User can access the Service Provider web/application.

Similarly, another integration platform that may determine feature usage data of the software application is an application integration platform. The application integration platform is a direct means to access software application feature usage data such as the amount of time spent on different features, and type of features used by a user in the organization. In one embodiment the type of feature may indicate whether the feature is provided in a free version of a software application, or it is provided by the paid or licensed version of the software application. The application integration allows us to understand how software application features are utilized by end users. There are two major elements that enable the application integration operation, they are: Application Programming Interface (API), and activities and actions tracking. An API is a collection of functions and procedures that define how software components should interact with one another. The API enables users to easily and quickly access the functionality of other software via well-defined data structures. Also, the activities and action tracking element in application integration platforms tracks different actions for example an in-app purchase has been made by any user then it results in a series of actions due to this activity initiated by the user. As a result, all the actions corresponding to any activity are tracked.

In some embodiments, the sources of feature usage data may also include browser extension and desktop agent. The browser extensions or browser agents would be helpful in capturing the websites visited by the users. The data captured by browser extensions may include URL, Title, Timestamp of opening and closing of the tab etc. Browser agents/extensions may be obtained for some of the popular web browsers such as Chrome, Firefox and Microsoft Edge. Similarly, the desktop agents would be able to capture information such as different apps installed on a user's system, sign in and sign out details on the apps, device level information like product ID, Internet Protocol (IP) addresses and hardware information and apps running in the background. Therefore, multiple integration platforms together help in extracting feature usage insights of software applications. The multiple integration platforms including SSO integration, application integration, browser extension, desktop agents, Cloud Access Security Broker (CASB) gather a large volume and variety of data which may be in the form of structured, unstructured and semi structured data. The data received from the various integration sources help in deriving insights on feature usage of different software applications used in an organization.

In alternate embodiment, another integration platform such as a Cloud Access Security Broker (CASB) is used to track the software application feature usage. Cloud Access Security Broker (CASB) is used for software application usage tracking. CASBs provide visibility into how cloud services and software applications are being used, which includes tracking software application feature usage. CASBs can track user activity, such as login attempts, file uploads and downloads, and other data transfer activities. CASBs may also track software application usage patterns to identify any unusual behaviour, such as unauthorized access attempts or data exfiltration. CASBs may track the software application usage in a variety of ways for example log analysis, API monitoring, User and Entity Behaviour Analytics (UEBA), to track software application usage.

After the software application usage data is collected from multiple integration platforms, the system determines the software application feature usage insights. In one embodiment, the feature usage insights are determined by processing one or more activity logs, database entries or JSON files including data about login and logout time for applications, specific feature used, feature usage time duration, number of sessions in a day, actions performed on features etc.

In one embodiment, the software application usage data may include below parameters:
a) Timestamps: The date and time of each event.
b) User ID: A unique identifier for the user who performed the action.
c) Session ID: A unique identifier for the user's session within software application.
d) Event Type: A description of the type of event that occurred (e.g. "Button Click", "Screen View", "Form Submission" etc.)
e) Feature Name: The name of the specific feature that the user interacted with (e.g. "Login", "Search", "Checkout" etc.)
f) Event Data: Additional information about the event, such as the specific button clicked, the search query entered, or the form fields filled out.

The processes the feature usage data obtained as shown above to determine the feature usage insights. The feature usage insight may indicate one or more of the duration of usage of a feature, frequency of the usage of the feature, if the frequently used feature is a premium feature or freely available, software application's associated resource utilization such as cloud storage, in-app purchases etc.

In one embodiment, the usage insights of the feature of the software application may include the feature usage pattern. The feature usage pattern may be determined from the feature usage data obtained by a combination of the integration platforms such as single sign on (SSO) integration platform, application integration platform, a browser extension, a desktop agent, and a cloud access security broker (CASB). In one embodiment the feature usage pattern may be determined from feature usage data obtained through a combination of an application integration and Single Sign On (SSO) integration. The usage pattern may indicate the engagement level of a user on a software application, such as sign-in and sign out time, the specific features being used, frequency of use of the specific features, duration of feature usage, type of user using specific features, user behaviour etc. The user behaviour may track the different actions performed before and after accessing a particular feature. In one embodiment, the usage insights of the feature of the software application may be obtained by using a tracking code in the software application. The system may be able to define the events or features of the software application in the tracking code of the software application.

In one embodiment, the usage insight of the feature would indicate the usage pattern of a particular feature in a group of users of a department in the organization.

In one embodiment, the feature usage insights may be obtained by processing the feature usage insight data to determine a feature engagement level of a user. The feature level engagement may be determined such as by measuring the level of interaction users have with a feature. Tracking different metrics such as the amount of time spent using a feature, the number of clicks or interactions within a feature, or the depth of engagement (e.g. the number of pages or screens viewed within a feature). Further, feature level engagement may also determine the number of users who access the feature, or the percentage of total sessions that include the feature. The feature level engagement may be determined using software development kits (SDKs) that can be integrated into software application code. Alternatively, APIs may also be used to collect the user engagement metrics to determine the feature level engagement of the software application.

In one of the embodiments, following steps are taken to track the software application feature level engagement:

A. Data Collection: Data is collected about how users are interacting with the software application. This can include data about button clicks, page views, time spent on a specific feature, and more.

B. Data Processing: After the data has been collected, it needs to be processed to extract insights and identify patterns. This can involve filtering, aggregating, and analysing the data to provide useful insights about how users are engaging with specific features.

C. Data Storage: Once the data has been processed, it needs to be stored in a database or other data storage system. This can involve storing the data in a structured format that makes it easy to analyse and extract insights.

D. Data Analysis and Usage Insights: After the data has been stored, it can be analysed to identify trends, patterns in software application's feature usage.

In one of the embodiments, the integration platforms may also provide information about license rights and any purchase of new license for particular applications. For example, information about the license tier of the software application is provided. A license tier of the software application indicates its level and number of features supported in a particular tier. Alternatively, a license tier of the software application may indicate different versions of the software application such as basic, standard, professional, and enterprise versions. Furthermore, the system 100 may provide usage patterns on licensed features, for example whether the user is actively using the purchased licensed feature of the software application or not. The usage pattern or user activity of software applications may be obtained using publicly available APIs for specific applications.

The system provides license optimization recommendations based on the usage insights from the features of the software application. Further, the recommendation may be provided based on a machine learning model. In one embodiment, the machine learning model is fed with a combination of usage data of a feature and usage insights of the feature of the software application. In another embodiment, the usage data of a feature of the software application and a metric associated with the software application are provided to the machine learning model to provide recommendations. The recommendation may suggest reallocation of a license tier of the software application. For example, if a user is not using the advanced feature of the subscribed license tier, then the user might be removed from the current license tier and provided with another appropriate license tier according to the usage requirement.

In one embodiment, the license optimization recommendation is provided to an IT administrator or a user with similar rights to manage the software application licenses. The IT administrator in an organization may have access to the above system and be able to view the license renewal suggestions or license tier reallocations as recommended. In one embodiment, the license optimization recommendation is provided on a Graphical User Interface (GUI). The GUI shows various optimization recommendations via a combination of tables, graphs and plots. Also, the IT administrator may take actions based on the options available on the GUI. For example, in one embodiment, the IT administrator may de-provision some licenses based on the license optimization recommendation. In one of the embodiments, the GUI may display the number of unused licenses, underused licenses, employees who left the organization with active licenses, underused storage etc. In another embodiment, the GUI may also display the total number of optimizable licenses, potential savings, wastage and realized savings. The GUI further provides multiple options to take actions on the recommendation for the license allocations in the form of various buttons on the GUI. The license optimization recommendations are based on a machine learning model. The machine learning model is first trained to provide license optimization recommendations. The machine learning model is trained on feature usage data of one or more software applications. Further, the feature usage data for training the machine learning model may be obtained from various integration platforms such as SSO and application integration platform. In an embodiment, the machine learning model may be trained on combination of usage data of the feature and usage insights of the feature of one or more software applications. The feature usage insight may include the number of times a feature has been used, the duration of usage of a feature and the frequency of usage of the feature. The feature usage insights may also include the license tier information such as if a particular feature belongs to a tier 1 or basic version of the software application. Further, a tier 2 or tier 3 may indicate a feature rich version of the software application. A regression model may be used to analyse the feature usage pattern of the software application for different users in the organization. Based on the regression model, the system would be able to predict and hence recommend the appropriate license tier. Alternatively, the system may cluster a group of software application users based on feature usage pattern and then subsequently recommend the appropriate license tier for a particular user in the organization.

In an embodiment, the machine learning model may assign weights to one or more features and the sources of the feature usage data. For example, features of a software application would be more important than others in a particular tier of the software application, hence applying weights accordingly. Similarly, the source of data may provide varying degrees of accuracy and details. Therefore, the different sources such as SSO, direct application integration, browser agents, CASB etc are weighted accordingly based on the learning from previous usage data and/or insights. For example, a sign in and sign out data from a SSO would be weighted relatively lesser in comparison to direct application integration data. The machine learning model assigns these weights based on the identified feature usage pattern and corresponding license tiers of the software applications from the previously trained and/or analysed data.

In an alternate embodiment, the machine learning model may assign priorities to the usage data sources and feature usage data. For example, a feature more relevant and highly used in a premium version of the software application may be assigned higher priority compared to the basic version of the software application. The machine learning model may provide license optimization recommendations based on the assigned priorities.

In one of the embodiments, a regression model is provided with feature usage insights of Zooms video conferencing solution. The different features of the Zoom® video conferencing solution may include, if a user is making video calls or not, cloud storage used, use of call recording features, screen sharing etc. The feature usage insights or the metrics associated with the features may include the duration of video calls or meetings, number of attendees, frequency of video calls, capacity of cloud storage occupied, etc. The regression model to train the feature usage insights may be chosen from a linear regression model, a logistic regression model and a polynomial regression model. In one implementation, a linear regression model would be provided with the feature usage data and/or insights to train the model. The regression model is generated by estimating the coefficients that relate the independent variables such as feature usage data and/or insights of the Zoom® application to the dependent variable which is the license tier recommendation. The model can be built using various methods, including maximum likelihood estimation, ordinary least squares, and others. Once the model is built, its performance can be evaluated using a testing data set. The testing data set may be obtained from the feature usage data and/or insights. Some of the common evaluation metrics for regression models include the mean squared error (MSE), root mean squared error (RMSE), R-squared ($R^2$), and others.

Subsequently, the model's performance is evaluated and refined if the performance is not satisfactory. The model is refined by adjusting the model parameters or selecting different independent variables as mentioned earlier. This process may involve iterative testing and refinement until a satisfactory level of performance is achieved. The regression model is finally used to make predictions for a specific license tier and the number of licenses for a software application in an organization. Further, the model is continuously updated or refined based on the feedback received from users. For instance, a user may provide feedback in the form of an objective answer Yes or No, if the recommendations are useful or not. The regression model may learn from this feedback and accordingly can update model learning. Alternatively, a user may also provide the feedback in the text format such that Natural Language Processing (NLP) techniques can be applied to understand the user feedback. Further, the feedback message action would be incorporated in the regression model to improve the model predictions.

In alternate embodiment, the system 100 may create user profiles based on the feature usage patterns identifying the preferred features and engagement level of different features of the software application. For example, a user using the premium feature of a software application most of the time, may be tagged in a premium user profile. In another scenario, if user engagement insights indicate unused premium features then that user would be tagged in a basic user profile. The user profile in one of the embodiments might be according to the subscription level required for software applications. For example, basic, standard, enterprise and premium, users can be tagged under these user profiles. Therefore, based on a user's profile, the system would generate recommendations for license tier with required features based on usage patterns. Alternatively, a user profile may also indicate the role and department of the user and subsequently based on the role and/or department a license tier of feature usage pattern may be determined.

Additionally, the system 100 would monitor how the user interacts with the recommended software application license tiers by tracking whether the user uses the suggested applications and frequency of usage. The tracking of the feature usage of the software application is taken as feedback to improve the recommendations over time. There may be two ways in which the system takes the feedback on usage of the recommended software application. Firstly, by continually analysing usage patterns of the recommended licenses. Secondly, a user may provide feedback. On the license recommendation. For instance, a user may provide feedback in the form of an objective answer Yes or No, if the recommendations are useful or not. The machine learning model may learn from this feedback and accordingly can update model learning. Alternatively, a user may also provide the feedback in the text format such that Natural Language Processing (NLP) techniques can be applied to understand the user feedback. Further, the feedback message action would be incorporated in the machine learning model to improve the model predictions. Therefore, the machine learning model would improve its recommendations over time and provide a better user experience.

The system 100 further forecasts the number of software licenses required in an organization based on the historical feature usage data. The forecasting of the software application licenses may be done based on another machine learning model. In one of the embodiments, a regression model may be used to train on the past usage data in an organization to predict the license requirements for the future. For example, in one embodiment, the system 100 may consider past months feature usage data to predict the number of licenses required currently or in future. The number of licenses prediction may include the category or license tier wise license distribution or a user group wise license prediction or a combination of both. The user group may belong to different teams or departments within the organization.

In one embodiment, the usage insights of the feature would indicate the usage pattern of a particular feature in a group of users of a department in the organization. In another embodiment, the feature usage insight may indicate the usage pattern across the organization. For example, in the case of a Zoom® application for video conferencing calls, the usage pattern may indicate that only 10% of the employees using the licensed version of the Zoom® application actually host the call beyond 30 minutes, and none of them use call recording feature. If the same usage pattern is observed from the past few months, the system forecasts that upon renewal of the subscription, the number of licenses required would be only 10% of the current subscription numbers.

In another scenario, the Zoom® application usage insights indicate that 90% of the current Zoom® application users in an organization have cloud storage occupied by more than 95% capacity. In such a scenario, the system may forecast the upgradation of license tiers for these sets of users to provide sufficient storage in the future. Hence, the system can forecast the number of licenses and the license tiers required across the organization or in specific departments of the organization. The system 100 may consider the specified time period from which the past usage data is taken to train the regression model. The system may also take the specified time period for which the number of licenses prediction to be made for the license optimization recommendation.

In one embodiment, the license optimization recommendation may be provided based on the usage insight obtained for a group of employees in an organization. For example, the group of the employees may represent a team in the organization such as IT, HR, Finance, ADMIN, Developers etc. The license optimization recommendation may suggest a particular license tier for a team or group of employees of the organization based on the usage insights. For example, in an organization, all employees in the HR department may be recommended a premium version of the Zoom® Application.

The license optimization recommendation includes for example the number of optimizable licenses, estimated wastage on those licenses and potential savings and realized savings at various levels. For example, savings at different levels may include users' license level, user application level, license level and application level. The user's license level savings recommendation would indicate the potential savings considering different users. Similarly for user application-level potential saving would indicate considering different application and user level mappings. Further, potential saving at different license tiers/level and at application level may be presented by the system.

Additionally, the hardware resources used in a SaaS environment are dependent on the number of software applications used and the variety of software applications allocated. For example, a basic version of the software application might not require cloud storage to securely store the software application data. In another example, a premium version of the software application may require image or video rendering and hence more processing power and memory would be required on cloud. Therefore, the license optimization results in optimizing the resources allocation dynamically. The processing resources requirement may be obtained by monitoring software application feature level usage. Further, a resource utilization monitoring would help in allocating the resources dynamically, the resources could be CPU, memory and/or network resources.

Furthermore, the security features implemented on various software applications may vary based on the different versions of the software applications. The different versions may indicate the license tier or features available in a particular software application. For example, encryption algorithms implemented for a premium version of a software application may include advanced features such as two factor authentication. Similarly, a basic version of the software application may implement basic encryption algorithms for data at rest or data in transit. The complex encryption algorithms require additional processing power, and more data is transmitted across the network. As a result, network resources should be allocated accordingly. Therefore, the license optimization also results in the optimizing the encryption techniques and resource requirements in the system.

Figure 2:
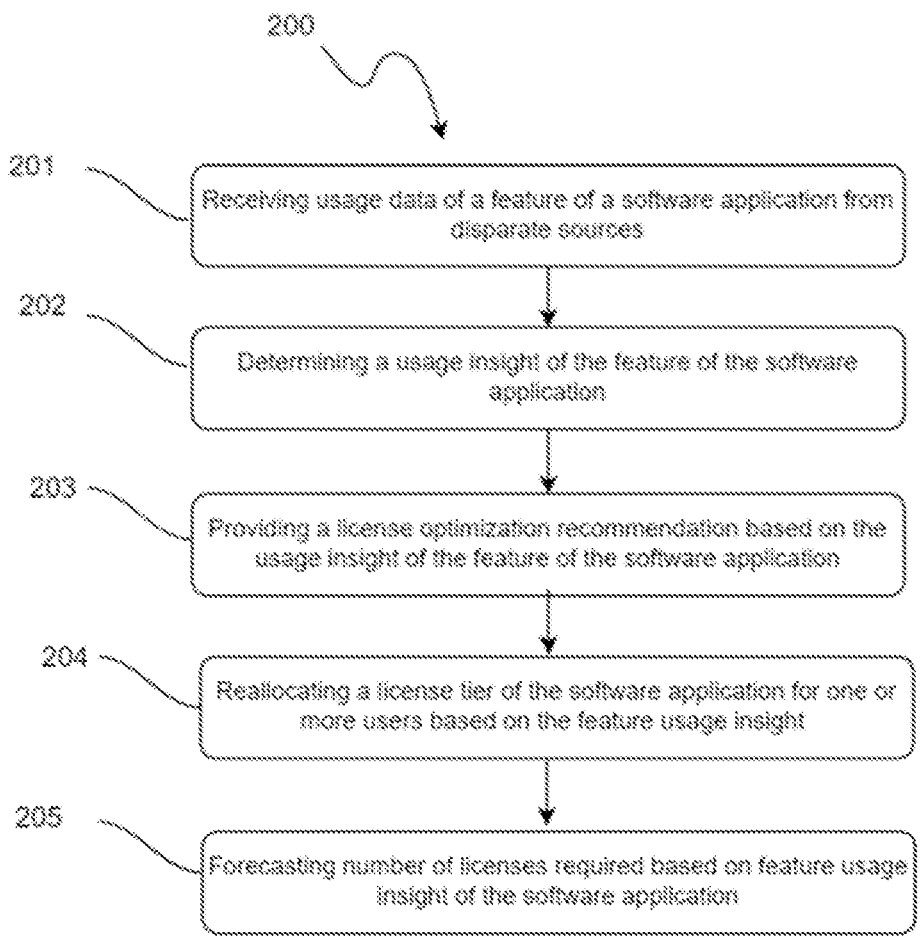
FIG. 2 illustrates a method for license optimization of a software application in an organization, in accordance with an embodiment of the present subject matter.

Referring now to FIG. 2, a method 200 a method for license optimization of a software application in an organization is disclosed in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method steps can be combined in any order to implement the method 200 or alternate methods for recommending software application license optimization. Furthermore, the method 200 for license optimization of a software application may be implemented in any suitable hardware, software, firmware, or combination thereof. However, for ease of explanation, in the embodiments described below, the method 200 may be considered to be implemented in the above-described system 100.

The method 200 is performed in various steps as shown in FIG. 2. Firstly, at step 201 a usage data of features of a software application is received from a variety of sources. The sources may include various integration platforms such as Single Sign On (SSO) integration platform, application integration platform, a browser extension, a desktop agent, and a cloud access security broker (CASB). A user in an organization may use the software application on a designated computer system or on a personal device and the integration platforms would be able to track the usage data of the software application on these devices. Further, at step 202 a usage insight of the feature of the software application is determined. The feature usage insight such as the amount of time spent on different features, and type of features used by a user of the software application. In one embodiment, the type of feature may indicate whether the feature is provided in a free version of a software application, or it is provided by the paid or licensed version of the software application. In one embodiment the feature usage insight may indicate the usage pattern of the user such as the engagement level of a user on a particular software application, for example a sign-in and sign out time, the specific features being used, frequency of use of the specific features, duration of feature usage, type of user using specific features, user behaviour etc. The user behaviour may track the different actions performed before and after accessing a particular feature. In another embodiment, the usage insight of the software application may include the metrics associated with the software application. The metrics would be specific to the software application.

At step 203, a license optimization recommendation is provided based on the usage insight of the feature of the software application. Further, the recommendation is provided using a machine learning model. The machine learning model may include a regression model to predict a license tier for a particular software application based on the feature usage insight. The license optimization recommendation may include the number of licenses to be discarded for a software application. The license optimization recommendation may also provide the specific license tier to be purchased along with a corresponding number of licenses for each software application. At step, 204, the method 200 reallocates the license tier of the software application for one or more users based on the feature usage insight. For example, if a user is not using the premium feature of the software application over a period of time, the user may be recommended to downgrade the license tier from premium (higher tier) to the basic version or lower tier of the software application.

At step 205, the method 200 provides forecasting of the number of licenses required based on the feature usage insight. In one embodiment, the forecasting is done using another regression model. Also, historic usage insights of features may be used to train the regression model. For example, past months feature usage data would be used to predict the licenses required for usage in upcoming months. The prediction may include the license 'category wise' prediction across the organization or 'user group wise' license prediction or a combination of both. The method 200 may consider the specified time period from which the past usage data to be taken to train the regression model. The system may also take the specified time period for which the license prediction to be made.

In one embodiment, the machine learning model is trained using historical feature usage insights. For example, one or more factors from the historical usage insights such as historical license utilization, historical license optimization recommendations, and the user feedback received to the historical license optimization recommendations for the software application may be used to train the machine learning model. The historical license optimization recommendation may include user profiles recommended with specific license tiers and further the feedback to the historic recommendation may indicate whether the user finally used the recommended license tier or not. For instance, if a particular license tier recommendation is not being continued or used by the user, the system automatically tracks this feedback to further improve its performance. In one embodiment, the machine learning model is recursively trained based on feedback received by the user to the license optimization recommendation. In another embodiment, the machine learning model is trained based on tracked feedback by the system on the further usage of the license recommendations.

The method 200, further may automatically de-provision or downgrade a particular license tier of a user based on the recommendation provided. For example, a higher tier or premium version of the software application might not be available anymore and it would be downgraded to a lower tier or basic version of the software application.

In one of the embodiments, the method 200, forecasts the number of licenses required based on one or more factors from, a number of licenses purchased, a license assignment rate, employee growth rate, employee attrition rate, usage of feature corresponding to the license tier. The license assignment rate may indicate how many licenses with specific license tiers are assigned in a particular team or group or across the organization. Further, the employee growth may include the average number of employees onboarded on a monthly or quarterly or yearly basis. Similarly, employee attrition rate would indicate the number of employees off-boarded on monthly or quarterly or yearly basis.

In one of the embodiments, the feature usage insight may include a metric associated with the software application. For example, if a software application is a video conferencing call solution, then the associated features would be whether the user conducts meetings or not, cloud storage, call recording, screen sharing etc. The metrics associated with the conferencing call solution would include duration of meetings, how frequent meetings are conducted etc. The other metrics associated with a feature may include a time spent on the feature and a frequency of use of the feature. Similarly, for an email application such as Gmail or Microsoft Outlook the associated features could be spam filtering, mobile access, voice to text mode usage to type emails etc. The associated metrics may include how many spam emails are received in a week, number of times voice to text feature used, how often the mobile device is used to check and send the emails etc.

In general, a feature and a metrics associated with the software application would be specific for different applications such as video conferencing applications such as Zoom, Microsoft teams, GoTo Meeting etc. may include video call feature, call recording feature, cloud storage etc. The associated metrics would be call frequency, duration and storage capacity requirements per user, etc. Similarly, the software applications in chat platforms such as slack, flock would have a different set of features and associated metrics.

The method 200, further provides automatic license optimization based on the usage insight of the feature of the software application. A set of rules are defined by the user to optimize the license renewal process automatically. For example, if a rule is set to remove all the licenses not used for a certain period of time, then the method automatically removes or unsubscribes those licenses without any manual intervention. In one embodiment, an IT administrator or a user with similar rights may set the rules and then remove the licenses based on the recommendation provided according to the usage insights. In one of the embodiments, the automatic license optimization is performed for at least one of a license tier, a license cost, and the number of licenses of the software application. The license optimization rules may be defined for specific license tiers, or cost of the licenses or simply the number of licenses required in the organization. For example, if the number of licenses for a software application exceeds beyond a number, then the system may take appropriate actions considering the feature usage insights for multiple users in the organization.

The license optimization recommendation of the method 200 further includes one or more of a number of optimizable licenses, a role-based license optimization, an actual cost saving, a wastage of a number of licenses, potential savings, and actual savings realized. The number of optimizable licenses indicates a certain number of licenses that can be removed or reallocated within the organization based on the usage insight of the feature of the software application. A role-based license optimization for example indicates that if a license for user with admin rights is provided that may or may not be considered for license optimization even though the feature usage might not be significant. Similarly, an organization based on different team requirements and roles decides if certain designations might not require few license tiers and hence can be removed from assigning those license or license tiers. The license optimization recommendation also provides the potential savings if a certain number of licenses are removed or re-allocated within the organization. Further, the actual savings over a period based on the current license usage and allocation and reallocation of licenses is also provided by the method 200.

In one embodiment, the method 200 provides grouping of similar software applications for the license optimization of the software application. The method provides optimization by grouping the software application with similar features of application or utility. For example, the video conferencing solutions like Zoom®, Microsoft teams, GoToMeeting might be used in the organization by different teams or users. These software applications can be grouped together and analysed for feature usage and further methods may recommend removing certain license subscriptions of these applications. Alternatively, the method may provide recommendations to use the one which is widely used in the organization and remove all other redundant software applications. The method 200 uses standard cosine similarity, a commonly used approach to match similar product item sets based on counting the maximum number of common features between the item sets.

The method 200, further comprises license optimization by utilizing combination of following steps:
  a) determining the number of unused licenses of the software application.
  b) determining last use of the software application.
  c) determining feature level usage data of the software application.
  d) determining a metric associated with the software application.

In one of the embodiments, the license optimization steps a)-d) would be performed in a sequential manner starting from step a). For instance, the method first determines the number of unused licenses of the software application. For example, the number of unused licenses in an organization are 50 out of 100 allocated licenses of a software application. The unused licenses may be determined by using different factors such as by determining the number of employees no longer part of the organization and had assigned licenses. The unused licenses may also include the software applications that are not at all used in a specific duration such as past three months or six months or a year. Next, the method 200 further determines when the software application was last used among the actively used software application licenses. For example, the audit logs might indicate the login and log out data for the software application and it would be possible to determine if the software application was last logged in or used for example 10 days or 30 days prior to the current date of determination. In the step c) feature usage data is determined for example a video conferencing solution would have features such as conducting meetings or not, cloud storage, call recording, screen sharing etc. In step d) metrics associated with the feature level data is determined. For example, the metrics associated with the video conferencing solution would be how frequently conference calls are conducted, capacity of cloud storage used on daily basis or weekly basis, call recording frequency etc. Therefore, step a) provides out of 100 licenses only 50 licenses are actively used therefore remaining 50 unused could be unsubscribed from paid licenses. At step b) for the active 50 licenses last login would be checked and if the usage is inconsistent, it can be further bucketed in the monitoring list of licenses of the software application. Step c) and d) would finally provide the license tier reallocation recommendation based on the feature level data and corresponding metrics determined. For example, if a user of the video conferencing solution is not using the call recording feature and further cloud storage is not required so the user license would be deprovisioned accordingly.

Exemplary embodiments discussed above may provide certain advantages. Though not required to practice aspects of the disclosure, these advantages may include those provided by the following features.

Some embodiments of the system and the method would help in optimizing the cost associated with deployment of software applications.

Some embodiments of the system and the method would help in efficient management of different licenses across the organization. Particularly, a more specific license tier allocation would be done across the organization.

Some embodiments of the system and the method would be helpful in efficiently allocating computing resources in an organization due to allocation of right software applications. Some applications might not require big storage and processing capabilities on the devices running the software applications.

Some embodiments of the system and the method of the subject matter where automatic license optimization is done in those scenarios the manual intervention is not required and therefore resources would be utilized efficiently.

Although implementation for methods and system for license optimization of a software application in an organization have been described in language specific to structural features and/or methods, it is to be understood that the appended claims are not necessarily limited to the specific features or methods described. Rather, the specific features and methods are disclosed as examples of implementations for license optimization of a software application in an organization.

The invention claimed is:

1. A method for license optimization of a software application in an organization, the method comprising:
receiving, by a processor, usage data of a plurality of features of the software application from one or more sources, wherein the software application comprises the plurality of features;
determining, by the processor, usage insights of the plurality of features based on the usage data of the plurality of features, wherein the usage data is at least one or more of historical usage data, historical license utilization, historical license optimization recommendations, and feedback received to the historical license optimization recommendations for the software application, and wherein the usage insights indicate an average time spent on the feature and a frequency of use of the feature for a duration;
providing, by the processor, a license optimization recommendation using a machine learning model, wherein the machine learning model assigns a weight to each feature of the plurality of features based on the usage insights and license tier of the software applications, and wherein the machine learning model uses the usage insights, one of the assigned weight of each feature, and the usage data to recommend license optimization to a user;
forecasting, by the processor, a number of licenses required based on the usage insights of the plurality of features of the software application in the organization, and
recommending a license optimization to a user, wherein the license optimization recommendation comprises reallocation of a license tier of the software applications.

2. The method as claimed in claim 1, wherein the machine learning model is recursively trained based on feedback received from the user for the license optimization recommendation.

3. The method as claimed in claim 1, further comprises automatically de-provisioning the user from a higher tier software application license to a lower tier software application license based on usage data of a feature of the software application.

4. The method as claimed in claim 1, wherein the forecasting is done based on one or more factors including a number of licenses purchased, a license assignment rate, an employee growth rate, an employee attrition rate, and usage data of a feature corresponding to the license tier.

5. The method as claimed in claim 1, wherein the usage data of the plurality of features is received from sources comprising one or more of a single sign-on (SSO) integration, an application integration, a browser extension, a desktop agent, and a cloud access security broker (CASB).

6. The method as claimed in claim 1, wherein the usage insights further indicate a metric associated with the software application.

7. The method as claimed in claim 1, further comprises an automatic license optimization based on the usage insights, wherein the automatic license optimization is performed for at least one of the license tier, a license cost, and the number of licenses of the software application.

8. The method as claimed in claim 1, wherein the machine learning model uses the usage insights, the assigned weight of each feature, and the usage data to recommend license optimization to a user.

9. The method as claimed in claim 1, wherein the license optimization recommendation further comprises one or more of a number of optimizable licenses, a role-based license optimization, an actual cost saving, a wastage of a number of licenses, potential savings, and actual savings realized.

10. The method as claimed in claim 1, further comprises grouping similar software applications for the license optimization of the software application.

11. The method as claimed in claim 1, wherein the license optimization comprises one or more of:
determining, by the processor, a number of unused licenses of the software application;

determining, by the processor, last use of the software application;

determining, by the processor usage data of a feature of the software application; and determining, by the processor, a metric associated with the usage data of the feature software application.

12. The method as claimed in claim 1, provides application license optimization recommendations on a graphical user interface (GUI) to take actions for license reallocations.

13. The method of claim 1, wherein the machine learning model further assigns a weight to the one or more sources.

14. A system for license optimization of a software application in an organization, the system comprising:

a memory; and a processor coupled to the memory, wherein the processor is configured to execute program instructions stored in the memory for receiving usage data of a plurality of features of the software application from one or more sources, wherein the software application comprises the plurality of features;

determining usage insights of the plurality of features of the software application based on the usage data of the plurality of features, wherein the usage data is at least one or more of historical usage data, historical license utilization, historical license optimization recommendations, and feedback received to the historical license optimization recommendations for the software application, and wherein the usage insights indicate an average time spent on the feature and a frequency of use of the feature for a duration;

providing a license optimization recommendation using a machine learning model, wherein the machine learning model assigns a weight to each feature of the plurality of features based on the usage insights and license tier of the software applications, and wherein the machine learning model uses the usage insights, one of the assigned weight of each feature, and the usage data to recommend license optimization to a user;

forecasting a number of licenses required based on the usage insights of the plurality of features of the software application in the organization, and recommending a license optimization to a user, wherein the license optimization recommendation comprises reallocation of a license tier of the software applications.

15. The system as claimed in claim 14, wherein the machine learning model is recursively trained based on a feedback received from the user for the license optimization recommendation.

16. The system as claimed in claim 14, further comprises automatically de-provisioning a user from a higher tier software application license to a lower tier software application license based on the usage data of the plurality of features of the software application.

17. The system of claim 14, wherein the machine learning model further assigns a weight to the one or more sources.

* * * * *